J. L. KUNZ & H. S. CANTROVITZ.
GEAR.
APPLICATION FILED FEB. 9, 1914.
1,147,805.
Patented July 27, 1915.
2 SHEETS—SHEET 1.
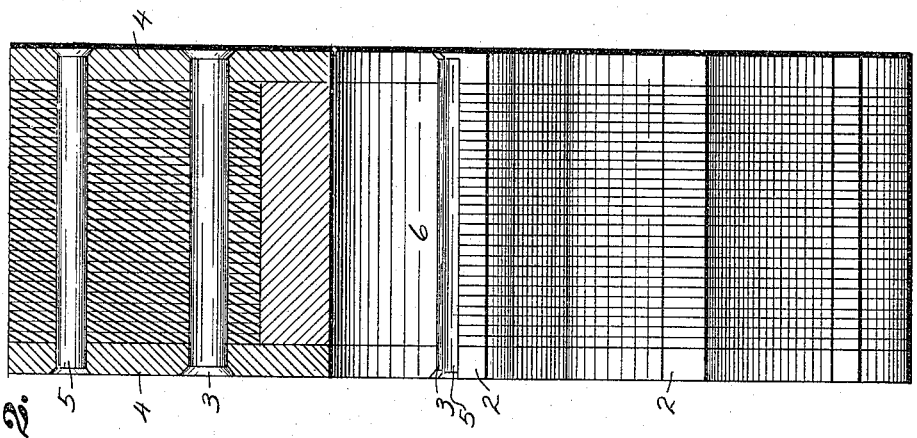
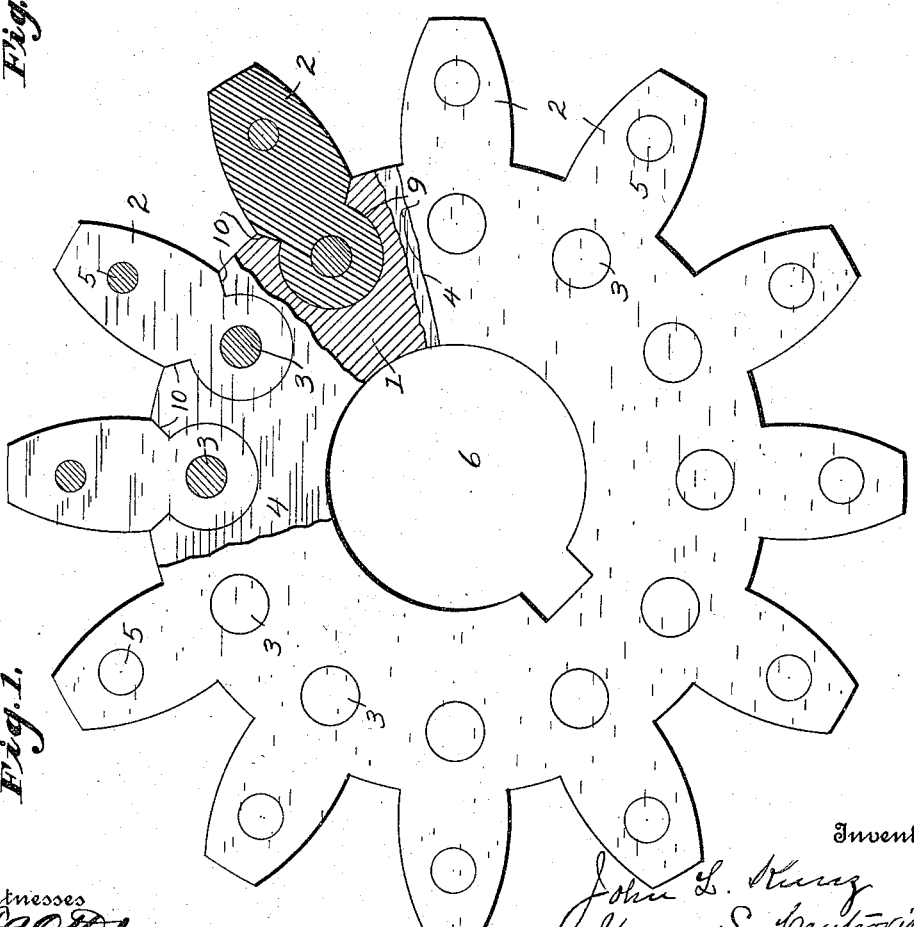

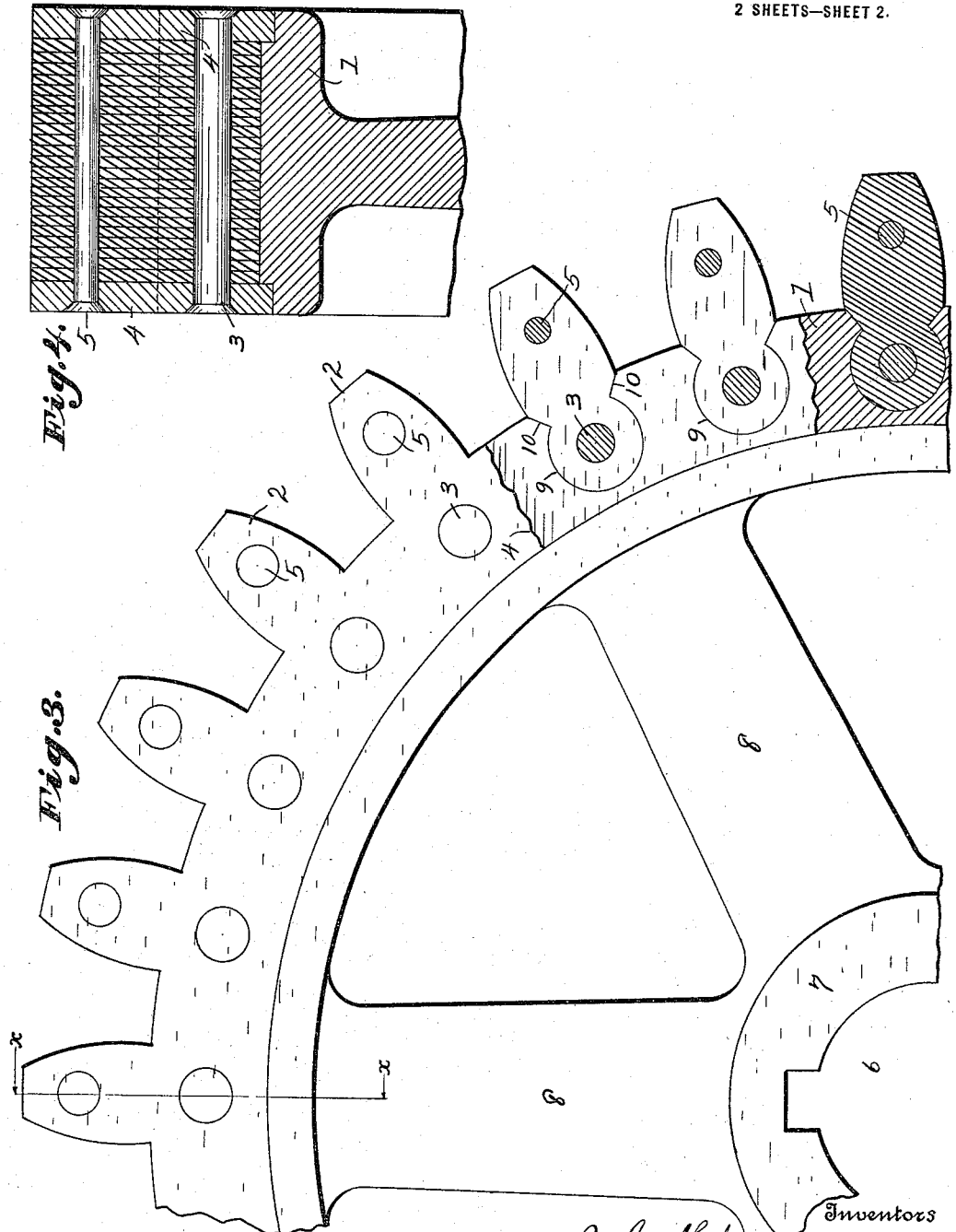

UNITED STATES PATENT OFFICE.

JOHN L. KUNZ AND HARRY S. CANTROVITZ, OF MILWAUKEE, WISCONSIN; SAID KUNZ ASSIGNOR OF ONE-HALF OF HIS RIGHT TO SAID CANTROVITZ.

GEAR.

1,147,805.      Specification of Letters Patent.      Patented July 27, 1915.

Application filed February 9, 1914. Serial No. 817,411.

*To all whom it may concern:*

Be it known that we, JOHN L. KUNZ and HARRY S. CANTROVITZ, citizens of the United States, residing at Milwaukee, county of Milwaukee, and State of Wisconsin, have invented new and useful Improvements in Gears, of which the following is a specification.

The object of our invention is to provide wheels having detachable teeth of great durability and also to lessen noise in operation without materially increasing the expense of construction over that of ordinary metal gear wheels.

To lessen the noise of tooth gears when in operation, it has heretofore been common to form the entire gear of raw hide, or other non-metallic material. By our improvement, the body of the gear is formed of metal and the teeth only are formed of raw hide, or other non-metallic substance, whereby the cost of such gears is greatly reduced, while the noise produced by their operation is no more than with gears formed entirely of raw hide, or other non-metallic substance.

Our invention is further explained by reference to the accompanying drawings, in which—

Figure 1 is a plan view of one form of gear, part of the retaining plate above the teeth being broken away to show the interior. Fig. 2 is a side view of the gear shown in Fig. 1, the left half being shown in section. Fig. 3 is a plan view of a part of a larger gear part broken away to show the interior and in which the teeth and the teeth supporting member are supported from the hub of the gear through a plurality of spokes and the teeth retaining plate extends inwardly toward the hub of the gear a short distance only past the teeth, and Fig. 4 is a transverse section drawn on line $x$—$x$ of Fig. 3.

Like parts are identified by the same reference numerals throughout the several views.

1 represents the metallic body of a gear to which an annular series of teeth 2 are attached. The teeth 2 are formed of raw hide, or other separate substance, and are firmly compressed together when they are secured to the metallic member 1 by an annular series of rivets or bolts 3 and 5 between the radial plates 4, which plates and bolts or rivets coöperate to reinforce and hold said teeth in place. The metallic member 1 is provided with a central aperture 6 for the reception of a supporting shaft from which it is adapted to be revolved.

By the form shown in Figs. 3 and 4, the teeth 2 and teeth supporting member 1 are supported from a central shaft, not shown, through the hub 7 and annular series of spokes 8, which spokes communicate between the hub 7 and the tooth supporting member 1.

Preparatory to securing the non-metallic teeth 2 to the metallic member 1, said metallic member 1 is provided with an annular series of circular apertures 9 for the reception of said teeth and said member 1 is also provided with an annular series of recesses 10, which recesses converge inwardly from the periphery of said member 1 to said circular apertures 9, the apertures 9 and inwardly converging recesses 10 being adapted to conform in shape to and nicely fit said non-metallic teeth, whereby as said non-metallic teeth are forced into said apertures they will be rigidly retained in place. After the teeth have been thus inserted, the radial plates 4, 4 are secured in place against the respective sides of said teeth and the sides of said metallic member 1 by the two annular series of rivets or bolts 3 and 5.

While we have described our gear teeth as non-metallic, yet the invention herein disclosed is of broader scope and not dependent wholly upon the character of the material employed. For example, said teeth may be composed in part of metal plates and in part of non-metallic plates laminated together, either in alternation or otherwise, or, if desired, said teeth may be composed entirely of laminated metal plates which may be cheaply formed of sheet metal stamped to the desired contour and used in connection with a gear wheel body formed of cast metal or of any other suitable material. In such case, the teeth would possess great strength and durability, although more noise would be produced than if some of the laminations were formed of non-metallic materials.

Having thus described our invention, what we claim as new, and desire to secure by Letters Patent, is—

1. In a gear of the described class, the combination of a metallic member provided near its periphery with an annular series of circular apertures having overhanging edges, an annular series of teeth formed of separate material from said metallic member, having circular ends conforming in shape to and adapted to nicely fit said apertures, said teeth being provided with an annular series of holes, two parallel radial plates provided with holes registering with the holes in said teeth, an annular series of bolts or rivets located in the holes of said teeth and radial plates.

2. In a gear of the described class, the combination of a metallic member provided in its periphery with an annular series of circular apertures having overhanging edges, an annular series of non-metallic teeth having circular ends located in said apertures, said teeth being each provided with two holes for the reception of bolts or rivets, two radial plates each provided with holes registering with the holes in said teeth, annular series of bolts or rivets located in the holes of said teeth and radial plates, said bolts or rivets being adapted to rigidly retain said teeth and metallic plates in place on said metallic members, while they reinforce the extreme ends of said teeth.

In testimony whereof we affix our signatures in the presence of two witnesses.

JOHN L. KUNZ.
HARRY S. CANTROVITZ.

Witnesses:
EDNA L. BREMER,
MIRIAM GAYLORD.

Copies of this patent may be obtained for five cents each, by addressing the "Commissioner of Patents, Washington, D. C."